(12) United States Patent
Takano et al.

(10) Patent No.: US 9,925,703 B2
(45) Date of Patent: Mar. 27, 2018

(54) METHOD FOR MOLDING FIBER-REINFORCED PLASTIC

(71) Applicant: Mitsubishi Chemical Corporation, Tokyo (JP)

(72) Inventors: Tsuneo Takano, Toyohashi (JP); Yuuji Kazehaya, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 341 days.

(21) Appl. No.: 14/438,020

(22) PCT Filed: Oct. 24, 2012

(86) PCT No.: PCT/JP2012/077496
§ 371 (c)(1),
(2) Date: Apr. 23, 2015

(87) PCT Pub. No.: WO2014/064784
PCT Pub. Date: May 1, 2014

(65) Prior Publication Data
US 2015/0273742 A1    Oct. 1, 2015

(51) Int. Cl.
*B29C 45/00* (2006.01)
*B29C 70/44* (2006.01)
(Continued)

(52) U.S. Cl.
CPC .......... *B29C 45/0055* (2013.01); *B29C 33/54* (2013.01); *B29C 70/44* (2013.01);
(Continued)

(58) Field of Classification Search
CPC ..... B29C 45/0055; B29C 33/54; B29C 70/44; B29C 70/48; B29C 70/865
See application file for complete search history.

(56) References Cited

U.S. PATENT DOCUMENTS

2009/0309268 A1    12/2009 Cavaliere et al.
2012/0141765 A1     6/2012 Katahira et al.

FOREIGN PATENT DOCUMENTS

CN    1675051 A    9/2005
FR    2 898 538 A1    9/2007
(Continued)

OTHER PUBLICATIONS

Extended European Search Report dated Jan. 22, 2016 in Patent Application No. 12887045.8.
(Continued)

*Primary Examiner* — Xiao Zhao
(74) *Attorney, Agent, or Firm* — Oblon, McClelland, Maier & Neustadt, L.L.P.

(57) ABSTRACT

The present invention relates to a method for molding fiber-reinforced plastic that is characterized: in comprising a process (1) for accommodating flowable grains comprising multiple particles in a flexible bag to form a core, a process (2) for interposing the core between fabric configured from fibers and placing the fabric and core inside a molding die, and a process (3) for injecting a resin into the molding die into which the fabric and core have been placed and curing; and in that, when performing the curing in process (3), a portion of one of the outer surfaces of the core is pressed and deformed by a pressing means to increase the internal pressure inside the core. The present invention provides a method for manufacturing fiber-reinforced plastics of excellent external appearance in which there are no defects such as wrinkles in the outer surface during forming using a core.

17 Claims, 5 Drawing Sheets

(51) Int. Cl.
    B29C 70/48    (2006.01)
    B29C 70/86    (2006.01)
    B29C 33/54    (2006.01)
    B29L 22/00    (2006.01)
(52) U.S. Cl.
    CPC ............ *B29C 70/48* (2013.01); *B29C 70/865* (2013.01); *B29L 2022/00* (2013.01)

(56) References Cited

FOREIGN PATENT DOCUMENTS

| JP | 55-079117 A | 6/1980 |
|----|-------------|--------|
| JP | 59-049931 A | 3/1984 |
| JP | 59-083609 A | 5/1984 |
| JP | 02-175135 A | 7/1990 |
| JP | 02-238912 A | 9/1990 |
| JP | 2001-847 A | 1/2001 |
| JP | 2007-190854 A | 8/2007 |
| JP | 2008-155383 A | 7/2008 |
| JP | 2009-039955 A | 2/2009 |
| JP | 2011-000847 A | 1/2011 |
| JP | 2012-111100 A | 6/2012 |
| WO | WO 2010/150065 A1 | 12/2010 |

OTHER PUBLICATIONS

Combined Chinese Office Action and Search Report dated Feb. 2, 2016 in Patent Application No. 201280076592.4 (with English language translation).

Office Action dated Feb. 11, 2016 in Korean Patent Application No. 10-2015-7010521 (with English language translation).

International Search Report dated Jan. 29, 2013 in PCT/JP2012/077496 filed Oct. 24, 2012.

Office Action dated Jan. 22, 2015 in Japanese Patent Application No. 2011-073985 filed Mar. 30, 2011 (with English translation).

METHOD FOR MOLDING FIBER-REINFORCED PLASTIC

TECHNICAL FIELD

The present invention relates to a molding method of manufacturing a molded article made of a fiber-reinforced plastic (FRP), comprising performing the resin transfer molding method on a fabric composed of fiber using a core.

BACKGROUND ART

Molded articles made of a fiber-reinforced plastic having a closed cross-section are widely used in large molded articles such as bodies and wings of aircrafts to small molded articles such as bicycle frames, tennis rackets, fishing rods and golf shafts. Molded articles made of a fiber-reinforced plastic having an open cross-section are also widely used for helmets and the like.

As a core for forming a closed cross-section, used are those in which foamed materials and/or powder-and-granular materials are wrapped with a packaging film and formed into a predetermined shape. Patent Document 1 proposes a method of manufacturing a fiber-reinforced plastic using a core in which a powder-and-granular material is formed into a desired form.

The invention described in Patent Document 1 will be described with reference to FIG. 5 as a conventional art 1 against the present invention.

FIG. 5 shows a schematic diagram to explain the resin impregnation step and the resin curing step in the method of manufacturing a molded article having a hollow portion using a molding die 108; the hollow portion is a variation of a closed cross-section. That is, a preform 107 produced by winding a reinforcing fiber around a core 104 is placed inside a cavity 109 of the molding die 108 along with the core 104. Here, a connection device (not shown) connectable to an air supply passage (not shown) installed through the molding die 108 is provided at a port of a film bag 105.

Subsequently, when the preform 107 and the core 104 are placed inside the cavity 109, the port of the film bag 105 which has been sealed is opened, and the connection device is attached to the air supply passage installed through the molding die 108, thereby the inside of the film bag 105 is connected. Note that the above air supply passage is connected with an air compressor (not shown), and the air discharged from the air compressor is supplied into the film bag 105 through the air supply passage.

Then, after the preform 107 is placed inside the cavity 109 along with the core 104, a resin injection device 110 is blocked from an injection hole 111 by a three-way valve 113 provided on an injection line 112 connecting the resin injection device 110 with the injection hole 111.

Next, the inside of the cavity 109 is decompressed to near vacuum through a discharging hole 115 by driving a vacuum pump 114 in a state where the vacuum pump 114 is connected with the discharging hole 115 by means of a three-way valve 117 provided in an aspiration line 116 connecting the vacuum pump 114 with the discharging hole 115.

Subsequently, while the inside of the cavity 109 remains decompressed, the resin injection device 110 is connected with the injection hole 111 by means of the three-way valve 113, and a resin impregnation step is performed in which a resin injected from the resin injection device 110 is injected into the cavity 109 through an injection inlet 111a. Note that a curing agent has been added to the resin with which the preform 107 is impregnated.

In the resin impregnation step, the resin injection device 110 discharges the resin at a fixed flow rate and at an injection pressure where the injection pressure of the resin is gradually increased to be a high pressure (for example, 5 MPa) at the end. Here, the injection pressure means a pressure of the resin discharged from the resin injection device 110, and corresponds to the detected pressure by the pressure gage 118.

When the resin is injected into the cavity 109 at a high pressure, the impregnating resin spreads over the entire preform 107. At this time, the core 104, which is hardened since the film bag 105 is filled with particles 106, will not undergo deformation and maintain the predetermined shape even when a high pressure is applied externally during resin injection.

Then, after resin injection is performed with the resin injection device 110 for a predetermined amount of time, the resin injection device 110 and the vacuum pump 114 are stopped. Further, the three-way valves 113 and 117 are opened to the atmosphere to end the resin injection.

Next, a resin curing step is performed to cure the resin. In the resin curing step, after the completion of the resin injection, heating of the resin is started by a heating means (not shown) such as a heater provided inside the molding die 108. Further, the inside of the film bag 105 is pressurized by supplying air into the film bag 105 by means of an air supplying means such as an air compressor.

When air is supplied into the film bag 105, the air passes through the particles 106, and uniformly diffuses over the inside of the film bag 105 as indicated by the dotted arrows in FIG. 5. As a result, the film bag 105 is internally pressurized at a pre-set pressure, and curing of the resin and pressurization of the inside of the film bag 105 are performed in parallel. Then, the film bag 105 uniformly presses against the inner surfaces of the preform 107 with its outer surfaces.

Note that when pressurizing the inside of the film bag 105, a pressure which balances with the pressure resulting from the curing and solidification contraction of the resin used is calculated by conducting preliminary experiments, and then the inside of the film bag 105 is pressurized to the pressure obtained from the experiments. Then, as the curing and solidification contraction of the resin are progressing, the pressure produced by the curing and solidification contraction of the resin will balance with the pressure within the film bag 105 to control the curing and solidification contraction of the resin. Therefore, sink marks which may occur on the surface of the FRP molded article (a phenomenon where a surface condition is roughened due to the failed transfer of the shape of a molding die which may occur when an air layer remains between the molding die and the molded article) can be controlled, or sink marks may be dispersed. Then, a pressure continues to be applied to the inner surfaces of the preform 107 with the film bag 105 until the curing of the resin is completed. When the curing of the resin is completed, heating the resin with the heating means and supplying air into the film bag 105 are stopped.

After the resin curing step is completed, a demolding step is performed for the FRP article. In the demolding step, the molding die 108 is opened, and the connection device provided on the film bag 105 is removed from the air supply passage, and the FRP article is taken out from the molding die 108 along with the core 104. In a step of removing the core 104, the port of the film bag 105 is opened to discharge the air present inside the film bag 105, and then the particles 106 contained in the film bag 105 are removed through the port to shrink the film bag 105. Then, the FRP article in a state where the core 104 is removed is manufactured by removing the film bag 105 from the FRP article.

PATENT DOCUMENT

Patent Document 1: Japanese Unexamined Patent Application, Publication No. JP 2008-155383 A

DISCLOSURE OF THE INVENTION

Problems to be Solved by the Invention

According to the invention described in Patent Document 1, an FRP product is manufactured by injecting a resin into a molding die to impregnate a preform with the resin, and then supplying a fluid or particles to a core, curing the resin while applying an internal pressure, and then performing demolding.

Patent Document 1 describes, as an example, a method in which particles that comprise the core are bonded using a water-soluble binder, a disassemblable adhesive and the like without causing deformation of the core due to a resin injection pressure when impregnating fiber or a fiber product with a resin. Therefore, it does not involve a scheme or step in which particles are allowed to flow. In a case where an FRP product is manufactured using the aforementioned method described in Patent Document 1, high precision is required for the external shape of the core. That is, the shape of the core is obtained by arranging an offset inward from the external shape of an FRP product by the thickness of a preform. Therefore, in a case where the precision in the shape of the core is low, the resin content in the FRP product may become uneven. In particular, in the case of a complex shape composed of multiple reinforced fiber sheets in which each sheet overlaps each other, the difference in the flow rate of the resin is developed, often resulting in a region un-impregnated with the resin. When a region un-impregnated with the resin is developed as described above, the region remains as a defect even though inside the film bag of the core is pressurized in the step of curing. In a case where a sufficient spacing is allowed between the core and the molding die, a region un-impregnated with a resin may not be developed, but the resin content may often become uneven. Therefore, in a case where a gas or a fluid is supplied into the core for pressurization, a high pressure is required for reforming the unevenness in the resin content. For this reason, when some of a pressurized gas or fluid is leaked from the core, the leaked gas or fluid may form a high-speed and high-pressure jet stream to be spouted to the outside in a high temperature state. In particular, in a case where a liquid is spouted, serious damage may be caused to the surrounding area of the molding die, and injuries may also be caused to operators. Therefore, thorough safety measures need to be applied to equipment. Further, in the above scheme and steps, even when particles are supplied into the core and pressurized, particles are not allowed to flow. Therefore, only area near the inlet is pressurized, and overall pressurization is difficult.

Means for Solving the Problems

In order to solve the above problems, the method of molding a fiber-reinforced plastic according to the present invention is best characterized as a method comprising the steps of:

(1) accommodating a flowable granular material comprising a large number of particles in a flexible bag to form a core; (2) interposing the core between fabric composed of fiber and placing the fabric and core inside a molding die; and (3) injecting a resin into the molding die in which the fabric and core have been placed, and then performing curing; wherein when curing is performed in step (3), a portion of one of the outer surfaces of the core is deformed by pressing with a pressing means to increase the internal pressure inside the core.

That is, the present invention has the following schemes.

[1] A method of molding a fiber-reinforced plastic comprising the steps of:

(1) accommodating a flowable granular material comprising a large number of particles in a flexible bag to form a core;

(2) interposing the core between fabric composed of fiber and placing the fabric and core inside a molding die; and (3) injecting a resin into the molding die in which the fabric and core have been placed, and then performing curing;

wherein when curing is performed in the step (3), a portion of one of the outer surfaces of the core is deformed by pressing with a pressing means to increase the internal pressure inside the core.

[2] The method of molding a fiber-reinforced plastic according to [1], wherein the flexible bag is a packaging film, and the step (1) comprises vacuum-packaging the granular material with the packaging film to form a core having a desired shape.

[3] The method of molding a fiber-reinforced plastic according to [1] or [2], wherein the granular material comprises particles having different diameters.

[4] The method of molding a fiber-reinforced plastic according to any one of [1] to [3], wherein the step (3) further comprises mold clamping pressurization after resin injection.

[5] The method of molding a fiber-reinforced plastic according to any one of [1] to [4], further comprising, after the step (3), the steps of: (4) opening a fluid-discharging hole at a position of the deformed portion of the one of the outer surfaces of the core by pressing; and (5) discharging the particles through the fluid-discharging hole.

Effects of the Invention

In the present invention, a core is used in which a granular material comprising a large number of particles configured to have a high fluidity is contained in a flexible bag. In addition, when injecting a resin into a molding die and then performing curing, a depressed portion is formed in one of the outer surfaces of the core by pressing a part of the outer surfaces of the core through or not through the fabric composed of fiber to forcibly increase the internal pressure of the core. Then, by increasing the internal pressure of the core, slippage is caused between particles constituting the granular material inside the core to deform the core.

Even in a case where a fabric wrapping the core is widely spaced from the core, the spacing can be narrowed by deforming the core. In particular, even in a case where a corner on the molding surface of the molding die is widely spaced from a fabric, the fabric can be moved in the direction where the spacing is narrowed by deforming the core.

PREFERRED MODE FOR CARRYING OUT THE INVENTION

Figure 1:
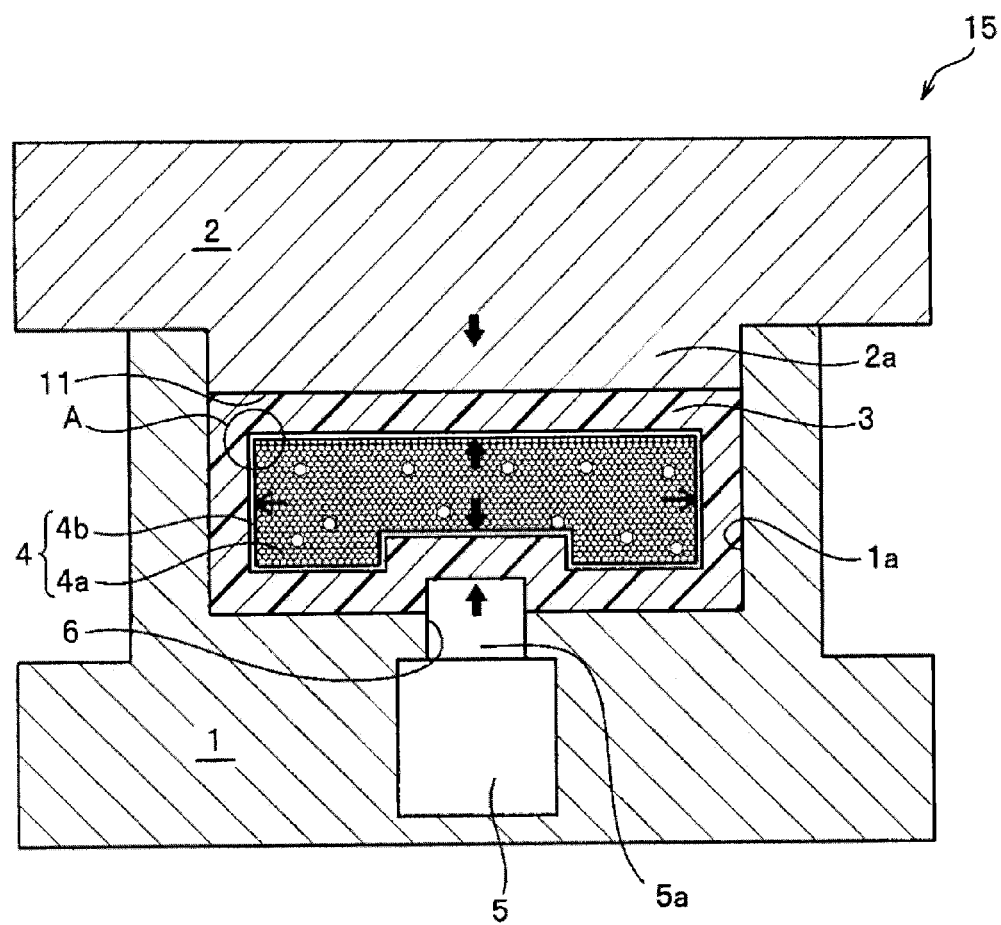
FIG. 1 shows a schematic view illustrating a molding die for casting when performing pressurizing according to an embodiment of the present invention.

Suitable embodiments of the present invention will be specifically described with reference to the following FIGS. 1 to 4. The method of molding a fiber-reinforced plastic according to the present invention can be adapted to configurations other than the molding dies, the cores and the like as described below as long as they are in a configuration in which a core may be deformed during pressure molding with a molding die.

In the method of molding a fiber-reinforced plastic according to the present invention, the step (1) comprises accommodating a flowable granular material comprising a large number of particles in a flexible bag to form a core.

A core comprises a packaging film made of an expandable and unfoldable material and a flowable granular material comprising particles. Among these, preferred is one in which a flowable granular material comprising a large number of particles is vacuum-packaged with the above packaging film. Further, examples of the above packaging film include nylon films, polyethylene films, fluororesin films, silicone rubber, and the like. Among these, nylon films and fluororesin films are preferred in view of thermal resistance and strength.

A core in which a flowable granular material comprising a large number of particles is vacuum-packaged with the above packaging film is preferred because it is easily formed, and can be formed into a precise shape. Further, in a case where such a core is used, when the internal pressure of the core increases, each particle in a granular material inside the core is to cause slippage in the directions from front to back and from side to side. Then, the packaging film with which the granular material is packaged is expandable and unfoldable, and can accommodate the deformation of the external shape of the core accompanied by the movement of the granular material.

The flowable granular material preferably comprises particles having different particle diameters. Here, the phrase "comprising particles having different particle diameters" refers to a granular material in which particles having particle diameters of 0.1 to 20 mm and having a substantially globular shape are combined so that subsets of the particles have different particle diameters, and the subsets of the particles having different particle diameters are each present in the mixture in a proportion of 10 to 90% relative to the total mass of particles constituting the granular material. As particles constituting a granular material, those in which ceramics such as alumina and zirconia, quartz, glass, hard thermal resistant resins, metals, foundry sand and the like are granulated can be used. Among these, it is preferable to use zirconia and quartz, which have a low thermal conductivity.

In the step (1), a core is configured such that a highly flowable granular material comprising a large number of particles is accommodated in a flexible bag. Therefore the core is deformable. Meanwhile, in a case where the above configuration is used, when one of the outer surfaces of the core is pressed to form a depressed portion in the outer surface so that the core is deformed, the internal pressure inside the core will not always show the same pressure condition at all the positions unlike it does when a fluid or gas is used. That is, even when a part of the outer surfaces of the core is pressed to apply pressure to the granular material inside, at the position other than the position to which pressure is applied, a pressure of a smaller magnitude than the pressure at the position to which the pressure was applied. Then, when the applied pressure is more than a certain value, slippage develops between particles constituting the granular material.

Therefore, in a case where a part of the outer surfaces of a core is pressed, even when the internal pressure is significantly increased at a position where a depressed portion is formed on a portion of one of the outer surfaces of the core due to pressing pressure, the increase in pressure at a position of the outer surfaces of the core distant from that position will be lower than the internal pressure at the position where the depressed portion is formed.

In particular, the transmissibility of pressure in a core and the fluidity of a granular material are affected by the surface roughness and particle diameter of the particles constituting the granular material. In a case where a granular material comprising particles having a homogenous particle diameter is used, the granular material is most densely packed in the core, which impairs the fluidity of the granular material, and decreases the transmissibility of pressure. Therefore, the fluidity of a granular material and the transmissibility of pressure in a core can be improved by considering the distribution of particle diameters and the surface roughness of particles inside the core, and by using granular materials comprising particles having different particle diameters in combination. According to the present invention, a granular material is used in which particles having particle diameters of 0.1 to 20 mm and having a substantially globular shape are combined so that subsets of the particles have different particle diameters, and the subsets of the particles having different particle diameters are each present in a mixture in a proportion of 10 to 90% relative to the total mass of the particles constituting the granular material. Therefore, it will not be most densely packed, allowing the granular material to have high fluidity and superior pressure transmittability inside the core.

A position in a core distant from a position in which a depressed portion is formed by pressing is also deformed so that the surface area of the outer periphery of the core expands due to the slippage of particles constituting a granular material. By this, a fabric can be pressed along the mold surface of the molding die.

A core can be stably pressurized since it is externally pressed in its closed form. In a case where the internal pressure of a core is excessively increased due to the clamping of the molding die or the pressing to form a depressed portion, a granular material may cause rupture of the packaging film since the packaging film does not have strength enough to maintain such pressure. However, if the spacing in the molding die is configured to be smaller than the diameters of particles, the granular material does not leak out of the molding die unless particles are crushed.

In the present invention, pressing means that press a portion of one of the outer surfaces of the core include a means in which the portion of the outer surface of the core is pressed with a rod projectable inwardly from the mold surface of the molding die. Examples of the rod projectable inwardly from the mold surface of a molding die include, for example, a configuration in which a piston rod is used as the rod. Further, a pressing member can be arranged at multiple positions.

In the present invention, the step (2) comprises interposing the core between fabric composed of fiber and placing the fabric and core inside a molding die so that the core is enclosed by the fabric.

As the fabric, preferred are those in which one or more fibers selected from carbon fiber, glass fiber, aramid fiber, silicon carbide fiber and the like are subjected to single axle weaving or multiaxial weaving. Further preferred are those composed of a nonwoven fabric which has random fiber directions and the like.

By interposing the core between fabric composed of fiber and placing the fabric and core inside a molding die so that the core is enclosed by the fabric, a portion of one of the outer surfaces of the core can be pressed through or not through the fabric when pressing a part of the outer surfaces of the core.

Figure 4:
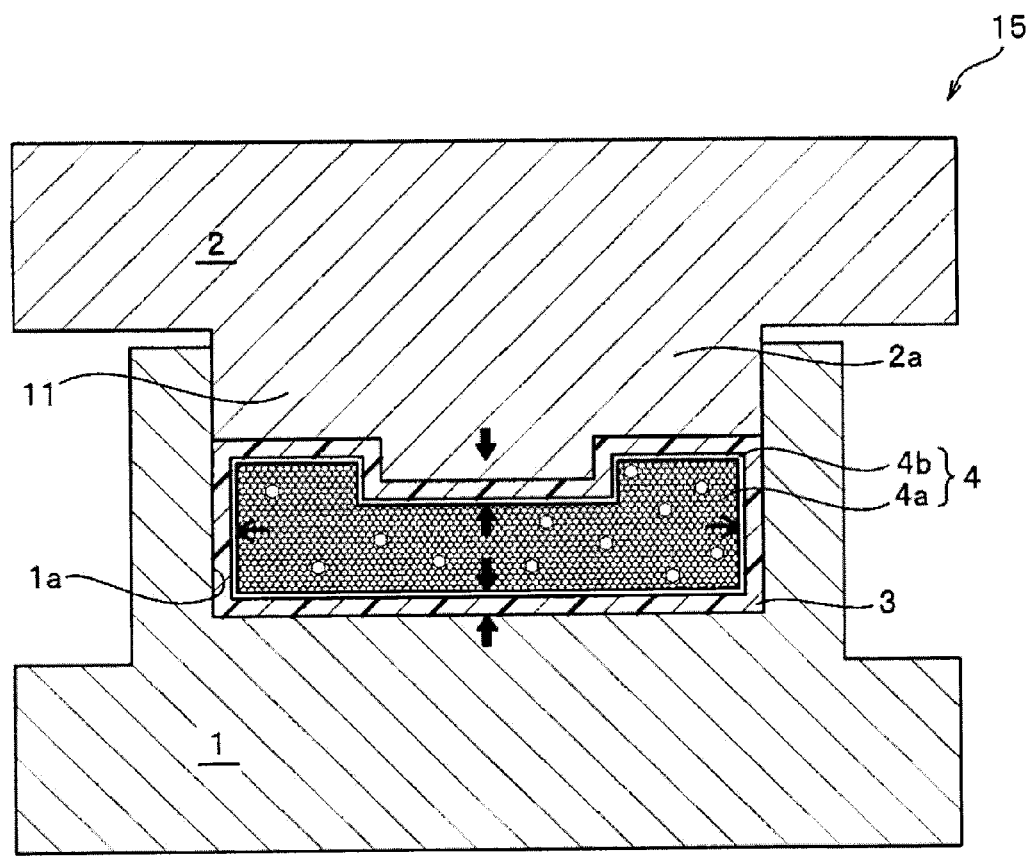
FIG. 4 shows a schematic view illustrating a molding die for casting when performing pressure molding according to another embodiment of the present invention.
Figure 5:
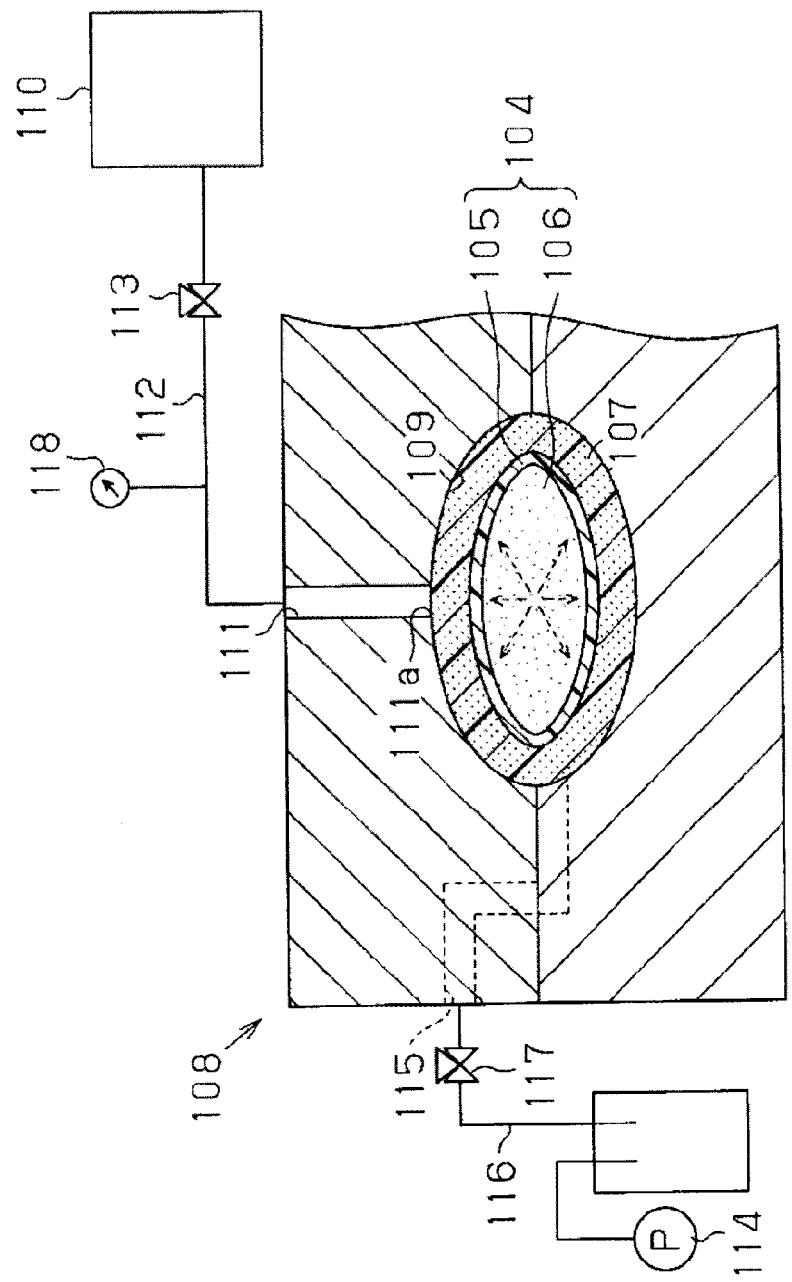
FIG. 5 shows a schematic diagram describing a conventional resin impregnation step and resin curing step.

Here, as shown in FIG. 4, when pressing through the fabric with a substantially planar portion of a molding die, a fabric becomes flat. In contrast, as shown in FIG. 1, a concave portion is formed in a fabric when pressing through the fabric with a convex shaped portion such as a piston rod.

Here, the term "substantially planar portion" refers to a portion having a shape like a replica of an inner surface of a molding die.

After the step (3), the present invention preferably comprises a step (4) of opening a fluid-discharging hole at a portion deformed by pressing a part of the outer surfaces of the core (hereinafter also referred to as "a pressed portion"), i.e., the above concave portion and planer portion, and a step (5) of discharging the above particles through the above fluid-discharging hole. In the present invention, a fluid-discharging hole may be opened at a position different from the pressed portion.

Further, in the present invention, when pressing a part of the outer surfaces of the core, the part of the outer surfaces of the core may be pressed without going through a fabric. When pressing a part of the outer surfaces of the core not through a fabric, a hole for a pressing member such as a rod is pre-opened in the fabric, and pressure is to be directly applied to the core. In the case of a molded article obtained by the method as described above, a packaging film can be torn via the above hole for a pressing member to discharge particles.

Further, in the present invention, a packaging film of the core is preferably subjected to a mold release treatment in which a release agent is applied and the like, or is preferably double-packaged. This allows the packaging film with which particles are in contact to be simultaneously removed when discharging the granular material through the fluid-discharging hole.

In the present invention, the step (3) comprises injecting a resin into the above molding die in which the above fabric and core have been placed, and then curing the resin.

Further, the method of molding a fiber-reinforced plastic according to the present invention is characterized in that the method comprises pressing and deforming a portion of one of the outer surfaces of the above core with a pressing means to increase the internal pressure of the above core when molding in step (3).

Specifically, in step (3) according to the present invention, first, a resin is injected into the molding die for casting in which the fabric and core have been placed, and then a part of the outer surfaces of the core is pressed with a pressing means. Then, in this step, the resin is cured while applying pressing pressure with the above pressing means.

As a resin to be injected into a molding die for casting, the followings can be used: a thermosetting resin such as an epoxy resin, a urea resin, a vinyl ester resin, an unsaturated polyester resin, a polyurethane resin and a phenolic resin. Among these, in view of the strength of an FRP product as the final molded article, an epoxy resin and a vinyl ester resin are preferably used.

A molding temperature when molding can be appropriately adjusted depending on the resin with which the molding die is filled, but is preferably 80 to 180° C., more preferably 110 to 150° C.

A curing time for the resin (hereinafter also referred to as "cure") is preferably 2 to 60 minutes, more preferably 3 to 10 minutes.

In the present invention, as a pressing means, a means for pressing a core with a piston rod as described above can be used, and further, two or more piston rods can be arranged. Alternatively, as shown in FIG. 4, a means for pressing a core with a molding die having a mold clamping mechanism which can produce a high pressure may also be used.

As a shape of a piston rod for pressing a core, the shape of a portion which makes contact with a core is preferably a round shape such as a cylindrical or a hemispherical. A portion in contact with a core having a round shape is preferred because a packaging film is less likely damaged.

Further, a molding die having a mold clamping mechanism which can produce a high pressure is preferably made of steel. A steel molding die having a mold clamping mechanism which can produce a high pressure is preferred in view of sufficient pressure resistance and durability.

The pressure when pressing a core with the above pressing means is preferably 1 to 10 MPa, more preferably 2 to 8 MPa.

Further, in the present invention, the step (3) preferably further comprises performing mold clamping pressurization after resin injection. Here, the term "mold clamping pressurization" refers to supplementary pressurization. Further, a pressure to be applied is preferably 1 to 10 MPa. This is preferred because by performing mold clamping pressurization at 1 to 10 MPa after resin injection, cure shrinkage can be controlled even when molding a resin showing a large cure shrinkage.

Example 1

As shown in FIG. 1, a preform in which a fabric 3 encasing a core 4 is formed into the same shape as that of the inner shape of a molding die 15 is placed inside a concave portion 1a formed in a lower mold 1 of the molding die 15 which is pre-heated.

In FIG. 1, the cross-sectional shape of the fabric 3 is formed into an annular shape, inside which the core 4 is interposed. Examples of such a configuration of the fabric 3 include, for example, a configuration in which the core 4 is wrapped between two sheet-like fabrics.

Then a thermosetting resin is injected from an injection hole (not shown) of the molding die 15 to impregnate the fabric 3 with the resin. Subsequently, thermal curing can be performed in the molding die 15 to manufacture a molded article of a fiber-reinforced plastic (FRP) of a desired shape.

In FIG. 1, the core 4 is used in which a granular material 4*a* is enclosed with a packaging film 4*b*, and a vacuum-sealed packaging is performed to obtain a desired outer shape, i.e., a rectangular shape.

A cylinder 5 having a piston rod 5*a* projectable into the cavity of the molding die 15 is provided in the lower mold 1. Note that in FIG. 1, lines for supplying and discharging an operating fluid to the pressure chamber of the cylinder 5 in order to slide the piston rod 5*a* is not shown. Below, the method of molding a fiber-reinforced plastic according to the present invention will described in more detail.

First, the fabric 3 placed inside the concave portion 1*a* of the lower mold 1 can be pressurized by moving the upper mold 2 and the lower mold 1 in a direction where they become closer, and then performing mold clamping. Here, as a mold clamping device comprising the upper mold 2 and the lower mold 1, a high-pressure press machine is preferably used.

When performing resin injection, the upper mold 2 and the lower mold 1 described above are preferably separated from the core 4 by a distance of about 0.1 to 1 mm so that the resin can be injected at relatively low pressure. After resin filling, the pressure in the core 4 is increased with the piston rod 5*a* or by further performing mold clamping. That is, after resin filling, pressurization is performed with at least either the piston rod 5*a* or mold clamping. Meanwhile, in a case where mold pressurization is not performed after resin filling, any mold clamping device can be used as long as it has an open-close mechanism of a mold, and a high-pressure press machine is not required.

Figure 2:
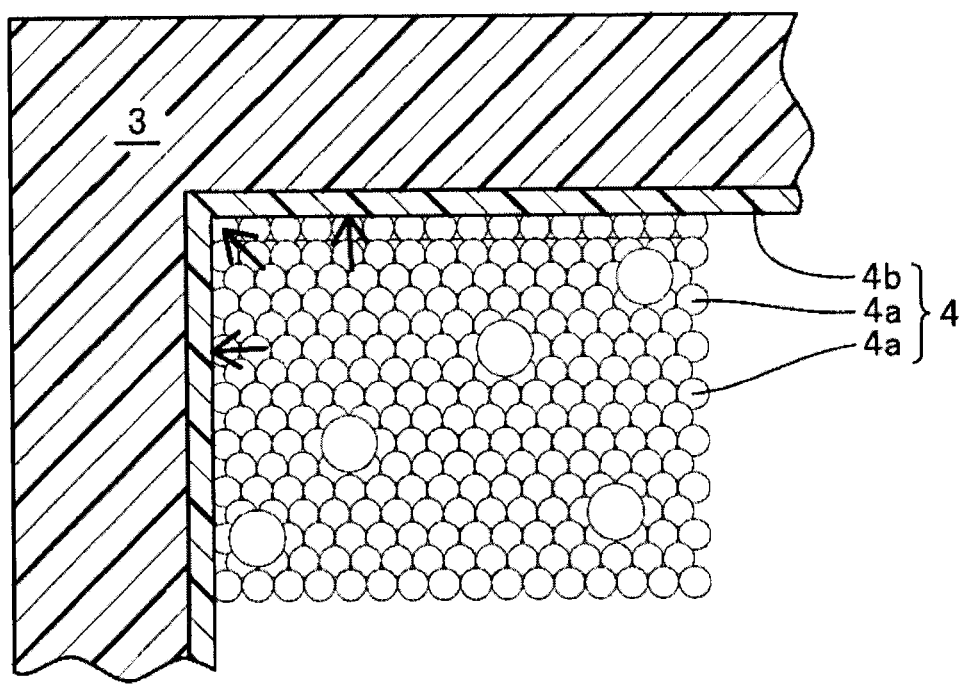
FIG. 2 shows a schematic view illustrating the internal structures of a fabric and a core.

After mold clamping, a portion of one of the outer surfaces of the core 4 interposed within the fabric 3 is pressed by projecting the piston rod 5*a* into the cavity of the molding die 15. This pressing pressure allows the fluidity of the granular material 4*a* comprising particles having different particle diameters to be improved to cause slippage in the granular material 4*a* inside the core 4, as shown in FIG. 2 which is an expanded view of a position A enclosed by a circle in FIG. 1.

In particular, the core 4 can be closely attached to the inner surface of the fabric 3 by deforming the core 4 even at four corners of the inner surface of the fabric 3 where a space or void often occurs. Therefore, a bend, a wrinkle, a space, and a void are not likely generated at a region along a longitudinal part of the inner surface formed along the wall of the concave portion 1*a*. As a result, a molded article with high dimensional precision can be obtained.

Even in a case where a space or void is formed between the fabric 3 impregnated with a resin in which the core 4 is enclosed and the core 4, by deforming the core 4, the air of the space or void will be crushed due to the high pressure in the core 4, or will be released into the atmosphere from the molding die 15 through the fabric 3 impregnated with the resin. Further, a passage formed when the air passes through the fabric 3 impregnated with the resin will be spontaneously closed by the fabric 3 impregnated with the resin.

Moreover, even in a case where a space or void is present between the molding die 15 and the fabric 3 impregnated with the resin in a corner of the molding die 15, the fabric 3 moves toward the space or void by pressing pressure from the core 4 which has expanded the shape of the outer surfaces. Then, the air of the space or void can be crushed by the high internal pressure, or can be extruded from the molding die 15 out to the atmosphere.

Note that in each figure used for the descriptions in Examples, for the purpose for clearly illustrating the packaging film 4*b*, the thickness of the packaging film 4*b* is shown to be exaggeratedly thick. Actually, the packaging film 4*b* can be configured to have a thin-film like shape having a thickness of 1 mm or less. More specifically, the film thickness of the packaging film 4*b* is preferably 0.05 to 1 mm. Note that the configuration for forming a molded article having a rectangular-pipe like shape is described in each figure, but a molded article according to the present invention may have other shapes having a closed cross-section.

Shapes having an approximately closed cross-section include those having a C-letter like cross-sectional shape and the like. For example, in a case where a molded article having a C-letter like cross-sectional shape is formed, a part of the cores 4 can be positioned to make direct contact with the molding surface of the upper mold 2 or the lower mold 1. Then, a molded article having a C-letter like cross-sectional shape can be manufactured by covering the surfaces of the core 4 which is not in contact with the molding surface with the fabric 3. Therefore, a closed cross-section in the present invention encompasses not only a rectangular-pipe like shape but also, for example, a C-letter like cross-sectional shape as described above.

As shown in FIG. 1, the concave portion 6 will be formed in the outer surfaces of the fabric 3 by pressing a portion of one of the outer surfaces of the core 4 with the piston rod 5*a*. When the outer surface of the core 4 is pressed with the piston rod 5*a*, the volume of the piston rod 5*a* projected into the volume of the granular material 4*a* is forcefully added to the volume of the core 4. As a result, the internal pressure inside the core 4 can be increased.

When the internal pressure of the core 4 is increased, the particles constituting the granular material 4*a* cause slippage amongst the particles, allowing the particles to move in the directions back and forth from side to side. However, since the packaging film 4*b* for packaging the granular material 4*a* is made of a material with which vacuum-sealed packaging can be performed, the packaging film 4*b* can be expanded and unfolded without substantially restricting the movement of the particles constituting the granular material 4*a*.

As described above, the method of molding a fiber-reinforced plastic according to the present invention is characterized in that the internal pressure of the core 4 can be increased to cause slippage between the particles constituting the granular material 4*a*. Therefore, as shown in FIG. 2, the core 4 can be deformed to eliminate a space or void between the core 4 and the fabric 3.

Moreover, the core 4 is deformed at a position where a space or void is likely generated, i.e., a position where the pressure between the fabrics 3 impregnated with a resin is low. Therefore, the thickness of the fabric 3 impregnated with a resin can be maintained at a predetermined thickness, i.e., 0.1 to 1 cm while eliminating the space or void.

As described above, the fabric 3 impregnated with a resin having a thickness of 0.1 to 1 cm and a desired outer periphery shape, i.e., the same shape as the inner shape of the molding die 15, can be pressure-molded.

Figure 3A:
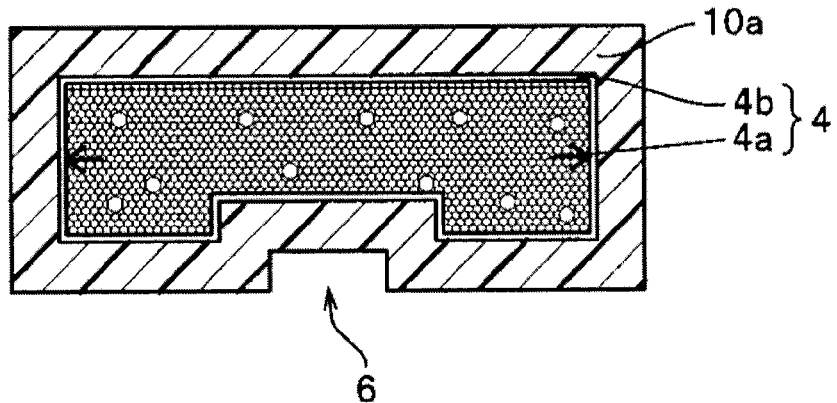
FIG. 3A shows a schematic view illustrating a state in which a semi-finished molded article after the completion of pressure molding is removed from the molding die in the manufacturing process of a molded article having a hollow portion.

FIG. 3A shows a schematic view illustrating a state in which a molded semi-finished article after the completion of pressure molding is removed from the molding die in a process of manufacturing a molded article having a hollow portion. The concave portion 6 is formed at a position of the fabric 3 pressed with the piston rod 5a in the molded semi-finished article 10a after the completion of pressure molding.

Figure 3B:
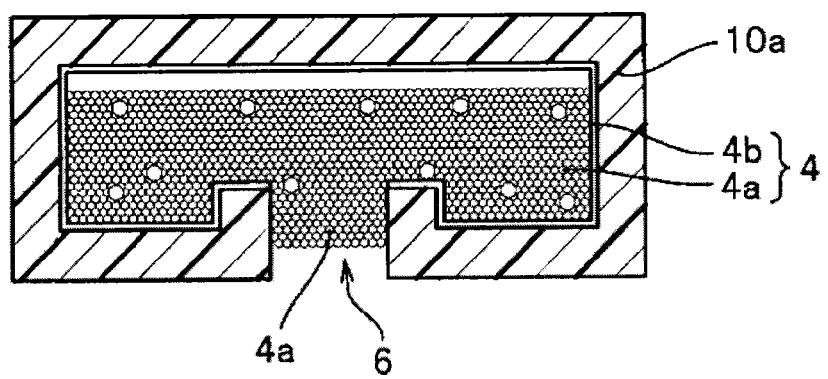
FIG. 3B shows a schematic view illustrating a state in which a discharging hole is opened at a concave portion of a semi-finished molded article in the manufacturing process of a molded article having a hollow portion.
Figure 3C:
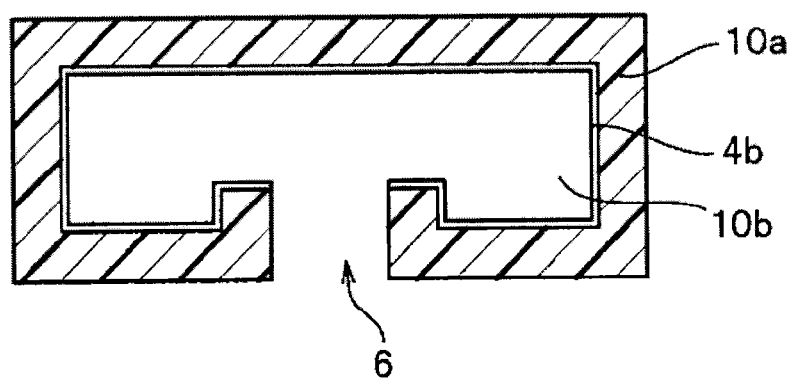
FIG. 3C shows a schematic view illustrating a state after discharging a granular material through a discharging hole opened at a concave portion of a semi-finished molded article in the manufacturing process of a molded article having a hollow portion.

FIG. 3B shows a schematic view illustrating a state in which a discharging hole is opened at a concave portion of the molded semi-finished article in a process of manufacturing a molded article having a hollow portion. As shown in FIG. 3B, when the discharging hole is opened at the concave portion 6, air flows in between the particles constituting the granular material 4a in the core 4 through the hole to disrupt the binding state between the particles constituting the granular material 4a. Subsequently, the granular material 4a having a disrupted binding state can be discharged to the outside through the discharging hole formed at the concave portion 6. Then, manufacture of a molded article 10 having a hollow portion 10b can be completed, as shown in FIG. 3C.

The packaging film 4b which makes contact with the granular material 4a can also be removed from the molded article 10 in a case where the packaging film 4b with which the granular material 4a has been vacuum-sealed is made of a material having good detachability from the molded article 10, or the packaging film 4b is double-packaged.

As described above, the method of molding a fiber-reinforced plastic according to the present invention can allow the fabric 3 impregnated with a resin to be pressure molded in a state where a space or void is not present between the core 4 and the fabric 3. Therefore, the molded article 10 having a desired outer periphery shape and a desired thickness without a bend and a wrinkle can be manufactured. Moreover, even in a case where the internal pressure inside the core 4 is low in a state where the molding die 15 is closed, the internal pressure inside the core 4 can be increased by the pressing pressure applied with the piston rod 5a. Therefore, the molded article 10 can be manufactured as a product having a desired thickness and a desired outer periphery shape.

The present Example 1 will be described more specifically.

As shown in FIG. 1, zirconia particles (a mixture of diameters of 1 mm and 3 mm, Tosoh Corp., Product name: YTZ Grinding Media (Ball Type) (the granular material 4a) was vacuum-sealed packaged with a nylon film (Airtech International Inc., Product name: WRIGHTLON 7400, thickness: 50 μm, the packaging film 4b) to produce the core 4. Further, the above core 4 was enclosed with 5 plies of a carbon fiber plain weave fabric (Mitsubishi Rayon Co., Ltd., Product name: TR3110) to obtain the fabric 3, and preformed into a shape substantially the same as the inner shape of the molding die 15. Next, the above preform was placed inside the concave portion 1a formed in the lower mold 1 of the molding die 15 at 80° C., and the upper mold 2 and the lower mold 1 were completely closed and clamped. Subsequently, after injection-filling the above preform with an epoxy resin (Nagase ChemteX Corporation, Product name: Denatite XNR/H6815), a portion of one of the outer surfaces of the core 4 was pressed with the piston rod 5a at a pressure of 3 MPa. Curing was performed for 120 minutes while pressing the portion of the outer surface at a pressure of 3 MPa, and then the molding die was opened to remove a molded article. A discharging hole was opened at the concave portion 6 formed by pressing with the piston rod 5a in the above molded article (FIG. 3A), and the granular material 4a was discharged through the discharging hole (FIG. 3B) to obtain a hollow molded article (FIG. 3C). The resulting molded article had a high dimensional precision, and had an excellent appearance in which no defects such as wrinkles were present on the outer surface. Here, the dimensional precision of the molded article refers to external dimensions, and can be measured with a device such as calipers or a three-dimensional measuring device.

Example 2

The configuration of Example 2 according to the present invention will be described with reference to FIG. 4. In Example 1, the configuration in which the piston rod 5a was used as a pressing means for pressing the core 4 is described. In contrast, in Example 2, the configuration is such that the piston rod 5a is not used for pressing the core 4. Others in the configuration are similar to those in Example 1. For the similar members to those in Example 1, the descriptions for those members are omitted, and the same reference numbers are used as in Example 1.

As shown in FIG. 4, the preformed fabric 3 is placed inside the concave portion 1a of the lower mold 1. As shown in FIG. 3C, the core 4 is placed inside the fabric 3 in order to manufacture the molded article 10 having a hollow portion 10b.

After resin injection, pressure molding is performed with the upper mold 2 and the lower mold 1 using a mold clamping device which can generate a high pressure, for example, a hydraulic press machine. By performing mold clamping, the fluidity of the granular material 4a comprising particles having different particle diameters can be improved, and formation of a space or void can be prevented between the core 4 and the fabric 3 impregnated with a resin by deforming the core 4. Then, formation of a space or void which is otherwise often generated between the mold surface of the casting mold 15 and the fabrics 3 impregnated with a resin can be prevented.

Example 2 will be more specifically described.

As shown in FIG. 4, molding was performed under similar conditions as in Example 1 except that the piston rod 5a was not used, and pressing pressure was applied with the upper mold 2. After opening the molding die to remove the molded article, a discharging hole was opened at a side of the molded article, and the granular material 4a was discharged outside through the discharging hole to obtain a hollow molded article. This molded article did not have defects such as wrinkles, and has an excellent appearance.

INDUSTRIAL APPLICABILITY

The present invention can be suitably applied to a method of molding a fiber-reinforced plastic in which a core is used.

EXPLANATION OF REFERENCE NUMERALS

1 Lower mold
1a Concave portion
2 Upper mold
3 Fabric
4 Core
4a Granular material
4b Packaging film
5 Cylinder
5a Piston rod
6 Concave portion
10a Semi-finished molded article
10b Hollow portion
15 Molding die 16 Injection hole
104 Core
105 Film bag as a bag member
106 Particle
107 Preform
108 Molding die
109 Cavity
110 Resin injection device
111 Injection hole
111a Inlet
112 Injection line
113 Three-way valve
114 Vacuum pump
115 Discharging hole
116 Aspiration line
117 Three-way valve
118 Pressure gage

The invention claimed is:

1. A method of molding a fiber-reinforced plastic, comprising injecting a resin into a molding die in which a fiber fabric and a core have been placed, and then performing curing;
wherein:
the core comprises a flowable granular material comprising particles in a flexible bag,
the core is interposed between the fabric in the molding die, and
during the curing, a portion of an outer surface of the core is deformed by pressing by projecting a pressing member into a cavity of the molding die, thereby increasing an internal pressure inside the core.

2. The method of claim 1, wherein the flexible bag is a packaging film, and core is formed by vacuum-packaging the granular material with the packaging film.

3. The method of claim 2, wherein the granular material comprises particles having different diameters.

4. The method of claim 3, further comprising mold clamping pressurization after injecting the resin.

5. The method of claim 4, further comprising, after injecting the resin:
opening a fluid-discharging hole at a position of a deformed portion of the outer surface of the core by pressing; and
discharging the particles through the fluid-discharging hole.

6. The method of claim 3, further comprising, after injecting the resin:
opening a fluid-discharging hole at a position of a deformed portion of the outer surface of the core by pressing; and
discharging the particles through the fluid-discharging hole.

7. The method of claim 2, further comprising mold clamping pressurization after injecting the resin.

8. The method of claim 7, further comprising, after injecting the resin:
opening a fluid-discharging hole at a position of a deformed portion of the outer surface of the core by pressing; and
discharging the particles through the fluid-discharging hole.

9. The method of claim 2, further comprising, after injecting the resin:
opening a fluid-discharging hole at a position of a deformed portion of the outer surface of the core by pressing; and
discharging the particles through the fluid-discharging hole.

10. The method of claim 1, wherein the granular material comprises particles having different diameters.

11. The method of claim 10, further comprising mold clamping pressurization after injecting the resin.

12. The method of claim 11, further comprising, after injecting the resin:
opening a fluid-discharging hole at a position of a deformed portion of the outer surface of the core by pressing; and
discharging the particles through the fluid-discharging hole.

13. The method of claim 10, further comprising, after injecting the resin:
opening a fluid-discharging hole at a position of a deformed portion of the outer surface of the core by pressing; and
discharging the particles through the fluid-discharging hole.

14. The method of claim 1, further comprising mold clamping pressurization after injecting the resin.

15. The method of claim 14, further comprising, after injecting the resin:
opening a fluid-discharging hole at a position of a deformed portion of the outer surface of the core by pressing; and
discharging the particles through the fluid-discharging hole.

16. The method of claim 1, further comprising, after injecting the resin:
opening a fluid-discharging hole at a position of a deformed portion of the outer surface of the core by pressing; and
discharging the particles through the fluid-discharging hole.

17. The method of claim 1, wherein the pressing member is a piston rod.

* * * * *